(12) United States Patent
Nguyen

(10) Patent No.: US 11,110,633 B2
(45) Date of Patent: Sep. 7, 2021

(54) IN-MOLD LID CLOSING APPARATUS

(71) Applicant: NYPROMOLD INC., Clinton, MA (US)

(72) Inventor: Tuan H. Nguyen, Clinton, MA (US)

(73) Assignee: Nypromold Inc., Clinton, MA (US)

( * ) Notice: Subject to any disclaimer, the term of this patent is extended or adjusted under 35 U.S.C. 154(b) by 304 days.

(21) Appl. No.: 16/007,714

(22) Filed: Jun. 13, 2018

(65) Prior Publication Data

US 2019/0381709 A1  Dec. 19, 2019

(51) Int. Cl.
| | |
|---|---|
| *B29C 45/26* | (2006.01) |
| *B29C 45/76* | (2006.01) |
| *B29C 45/00* | (2006.01) |
| *B29L 31/56* | (2006.01) |

(52) U.S. Cl.
CPC ............ *B29C 45/006* (2013.01); *B29C 45/26* (2013.01); *B29C 45/76* (2013.01); *B29C 2045/0056* (2013.01); *B29C 2045/2683* (2013.01); *B29L 2031/56* (2013.01)

(58) Field of Classification Search
CPC .......... B29C 45/006; B29C 2045/0056; B29C 45/26; B29C 45/76; B29L 2031/56
See application file for complete search history.

(56) References Cited

U.S. PATENT DOCUMENTS

| | | | |
|---|---|---|---|
| 4,040,595 A | * | 8/1977 | Tecco .................... B29C 45/006 249/68 |
| 4,818,208 A | | 4/1989 | Byrne |
| 5,234,328 A | | 8/1993 | Willson et al. |
| 6,566,837 B1 | * | 5/2003 | Zhang .................... G05B 19/19 318/610 |
| 7,407,618 B2 | | 8/2008 | Vanderploeg et al. |
| 7,470,387 B2 | | 12/2008 | Chiu |

(Continued)

FOREIGN PATENT DOCUMENTS

| | | | |
|---|---|---|---|
| JP | 2002190695 A | * | 7/2002 |
| WO | WO2016141461 | | 9/2016 |

(Continued)

OTHER PUBLICATIONS

European Search Report, dated Nov. 6, 2019, From corresponding European Application No. EP19179414.

*Primary Examiner* — Joseph S Del Sole
*Assistant Examiner* — Jerzi H Moreno Hernande
(74) *Attorney, Agent, or Firm* — Duquette Law Group, LLC

(57) ABSTRACT

An in-mold lid closing apparatus includes a lid engagement member, a first actuation assembly connected to a first portion of the lid engagement member, a second actuation assembly connected to a second opposing portion of the lid engagement member, and a controller disposed in electrical communication with the first actuation assembly and the second actuation assembly. The controller is configured to transmit a first drive signal to the first actuation assembly and a second drive signal to the second actuation assembly to drive one of a linear position and a rotational position of the lid engagement member and to adjust at least one of the first drive signal and the second drive signal based upon a first feedback signal received from the first actuation assembly and a second feedback signal received from the second actuation assembly.

18 Claims, 13 Drawing Sheets

(56) References Cited

U.S. PATENT DOCUMENTS

| | | | |
|---|---|---|---|
| 9,498,906 B1 | 11/2016 | Soehnlen et al. | |
| 2004/0222559 A1 | 11/2004 | Gomes et al. | |
| 2007/0085506 A1* | 4/2007 | Oks | G05B 19/318 |
| | | | 318/609 |
| 2007/0158401 A1* | 7/2007 | Katoh | G03F 7/70725 |
| | | | 235/375 |
| 2008/0103028 A1* | 5/2008 | Wu | F16C 29/0602 |
| | | | 482/57 |
| 2008/0260890 A1 | 10/2008 | Disimone | |
| 2010/0276841 A1* | 11/2010 | Armbruster | B29C 45/045 |
| | | | 264/310 |
| 2012/0088000 A1 | 4/2012 | Armbruster | |
| 2016/0263795 A1 | 9/2016 | Jebely et al. | |

FOREIGN PATENT DOCUMENTS

| | | | |
|---|---|---|---|
| WO | WO2018191813 | 10/2018 | |
| WO | WO-2019053292 A1 * | 3/2019 | B29C 45/006 |

\* cited by examiner

IN-MOLD LID CLOSING APPARATUS

BACKGROUND

Field

Embodiments of the innovation relate, generally, to an apparatus used with an injection mold and configured to close a lid on a molded part following molding of the part by the injection mold.

Description of the Background

Manufacturers utilize injection molds to produce a variety of molded articles. For example, certain injection molds are used to form molded caps having a base portion, a lid portion, and a hinge connecting the base and lid portions. Following molding of the caps, certain injection molds are configured to close the lid portion onto the base portion before the molded cap is processed further. By closing the hinged lid portion onto the base portion following the molding process, the injection mold can aid in maintaining the sterility of the interior of the molded caps and can mitigate a need for additional processing to close the lid portion onto the base portion following ejection of the molded caps from the injection mold.

FIG. 1 illustrates an example of one-half of an injection mold 2 having a lid closing mechanism 4 configured to dispose molded caps in a closed position prior to ejection. For example, the lid closing mechanism 4 can include lid engagement members 5 disposed in proximity to corresponding mold cavities 6 utilized to form molded caps. The lid closing mechanism 4 also includes a linear actuator 7 configured to adjust the vertical positioning of the lid engagement members 5 relative to the molded caps and a rotational actuator 8 configured to rotate the lid engagement members 5 to close the respective lid portions onto the base portions of the molded caps.

SUMMARY

In an embodiment of the present innovation, an in-mold lid closing apparatus includes a lid engagement member, a first actuation assembly connected to a first portion of the lid engagement member and a second actuation assembly connected to a second opposing portion of the lid engagement member, the first actuation assembly and the second actuation assembly configured to dispose the lid engagement member between a first linear position and a second linear position relative to an in-mold lid and between a first rotational position and a second rotational position relative to the in-mold lid, and a controller disposed in electrical communication with the first actuation assembly and the second actuation assembly. The controller may be configured to transmit a first drive signal to the first actuation assembly and a second drive signal to the second actuation assembly to drive one of the linear position and the rotational position of the lid engagement member. The controller may be configured to adjust at least one of the first drive signal and the second drive signal based upon a first feedback signal received from the first actuation assembly identifying a position of the first portion of the lid engagement member and a second feedback signal received from the second actuation assembly identifying a position of the second portion of the lid engagement member.

In an embodiment of the present innovation, an injection molding system includes a first mold plate defining a first mold cavity, a second mold plate opposing the first mold plate and defining a second mold cavity, and an in-mold lid closing apparatus coupled to the second mold plate. The in-mold lid closing apparatus may include a lid engagement member, a first actuation assembly connected to a first portion of the lid engagement member and a second actuation assembly connected to a second opposing portion of the lid engagement member, the first actuation assembly and the second actuation assembly configured to dispose the lid engagement member between a first linear position and a second linear position relative to an in-mold lid and between a first rotational position and a second rotational position relative to the in-mold lid, and a controller disposed in electrical communication with the first actuation assembly and the second actuation assembly. The controller may be configured to transmit a first drive signal to the first actuation assembly and a second drive signal to the second actuation assembly to drive one of the linear position and the rotational position of the lid engagement member. The controller may be configured to adjust at least one of the first drive signal and the second drive signal based upon a first feedback signal received from the first actuation assembly identifying a position of the first portion of the lid engagement member and a second feedback signal received from the second actuation assembly identifying a position of the second portion of the lid engagement member.

BRIEF DESCRIPTION OF THE DRAWINGS

The foregoing and other features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Figure 1:
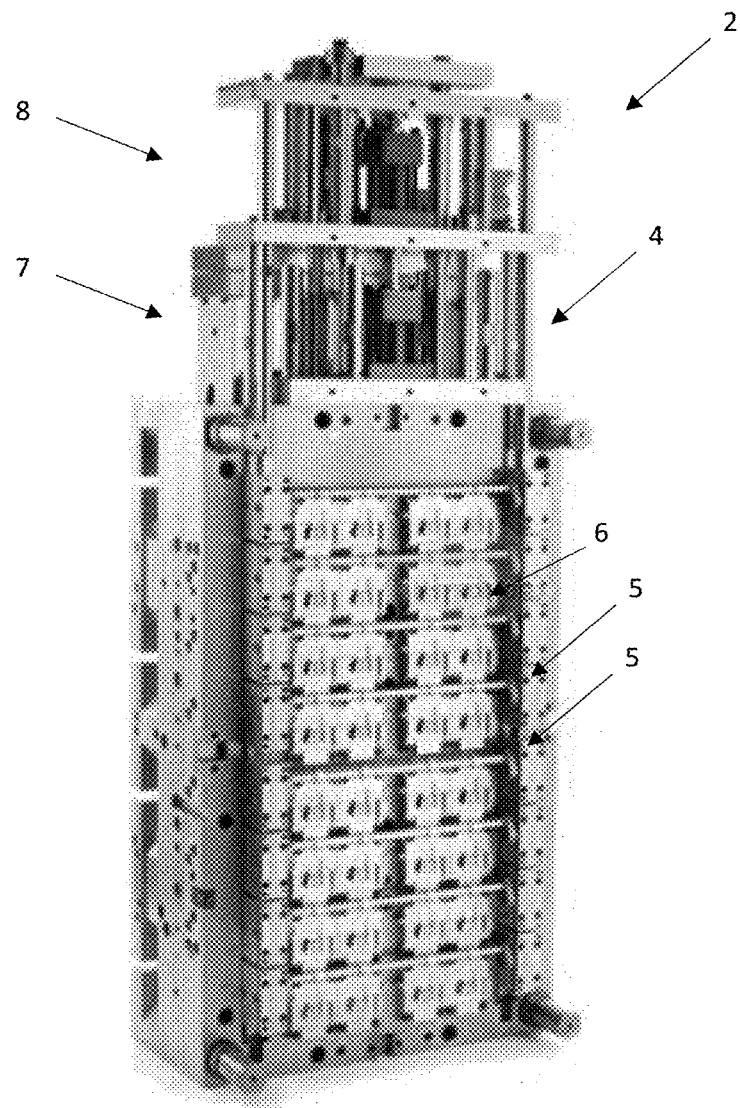
FIG. 1 illustrates one-half of a prior art injection mold having a lid closing mechanism.

With conventional injection molds, such as shown in FIG. 1, the lid closing mechanism 4 includes a linear actuator 7 and a rotational actuator 2 configured to position lid engagement members 5 relative to a molded cap to dispose the molded cap in a closed state. However, in order to provide such motion to the lid engagement members 5, these injection molds 2 have the linear and rotational actuators 7, 8 disposed in a stacked arrangement (i.e., the rotational actuator 8 mounted on top of the linear actuator 7). While this arrangement produces the desired motion of the lid engagement members 5, stacking of the linear and rotational actuators 7, 8 adds to the overall height of the injection mold 2, thereby requiring a relatively large physical space for operation of the injection mold 2. Further, the use of multiple, separate actuation assemblies to position the lid engagement members can add to the cost of the injection mold, as well as to the complexity of injection mold which can, in turn, lead to an increase in the amount of maintenance for the injection mold.

By contrast to conventional lid closing mechanisms for injection molds, embodiments of the present innovation relate to an in-mold lid closing apparatus which utilizes parallel linear and rotary actuation assemblies to position and rotate a lid engagement member or shaft relative to a set of in-mold molded caps. For example, the lid closing apparatus may include a first actuation assembly disposed at a first location relative to a set of in-mold molded caps and a second actuation assembly disposed at a second location relative to the set of in-mold molded caps. The lid closing apparatus may include a lid engagement member disposed between, and connected to, each of the first and second actuation assembly such that a longitudinal axis of the lid engagement member is substantially parallel to the axes of rotation of the cap lids of the set of in-mold molded caps. The first and second actuation assemblies may include first and second position sensors disposed in electrical communication with a controller. The controller may utilize first and second feedback signals received from the first and second position sensors as part of a feedback loop as a basis to adjust first and second drive signals provided to the actuation assemblies, respectively. The controller may therefore be configured to control the linear and/or rotational positioning of the lid engagement member for a number of in-mold molded caps while minimizing binding of the actuation assemblies, such as caused by uneven translation or rotation of the lid engagement member during use.

Figure 2:
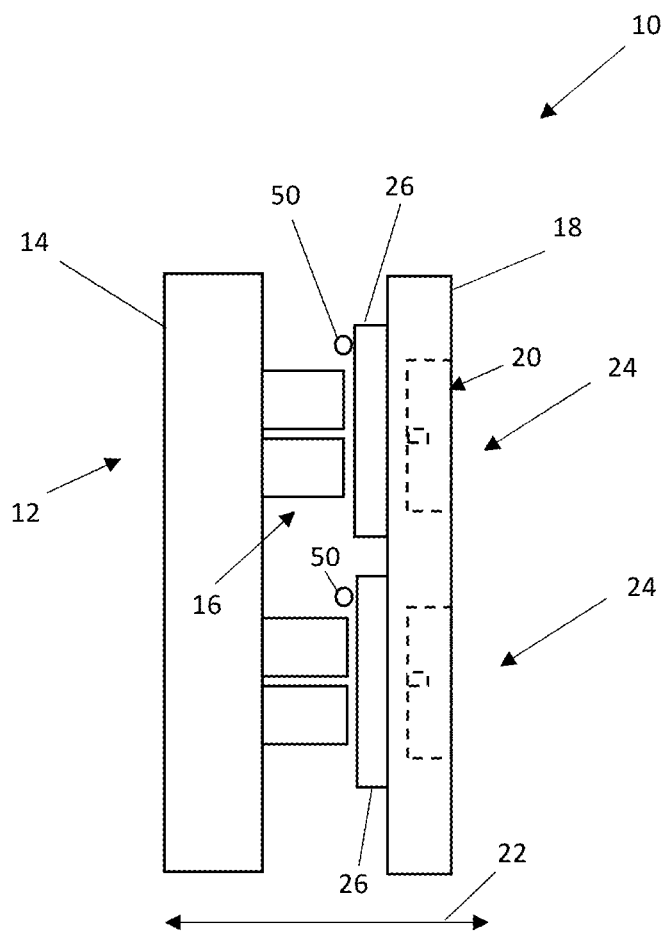
FIG. 2 illustrates a side-sectional, schematic view of an injection molding system having an in-mold lid closing apparatus.

FIG. 2 illustrates a schematic representation of an injection molding system 10, according to an embodiment of the present innovation. The injection molding system 10 may include a mold assembly 12 having a first mold plate 14 including a first set of cap mold elements 16 and a second mold plate 18 including a corresponding second set of cap mold elements 20. Taken together, the first and second set of cap mold elements 16, 20 define a volume of a cap having a lid, a base, and a hinge which attaches the lid to the base.

The injection molding system 10 may be configured to adjust the relative lateral positioning of the first and second mold plates 12, 18 and the corresponding first and second cap mold elements 16, 20. For example, during operation, the injection molding system 10 may position the first and second mold plates 12, 18 along axis 22 to a closed position to allow the injection of a material into the volume between the first and second sets of mold elements 16, 20 to create a molded cap. Following formation of the molded caps, the injection molding system 10 may position the first and second mold plates 12, 18 along axis 22 to an open position, as shown, to allow ejection of the caps from the second mold plate 18.

The injection molding system 10 may also include an in-mold lid closing apparatus 24 coupled to the second mold plate 18. For example, the in-mold lid closing apparatus 24 may be configured to close the lid of each molded cap against the cap's base prior to ejection of the cap from the second mold plate 18. In one embodiment, following the molding procedure, the injection molding system 10 may position the first and second mold plates 12, 18 along axis 22 from a closed position to an opened position as shown. Further, actuation assemblies 26 of the in-mold lid closing apparatus 24 may linearly and rotationally position a lid engagement member 50 relative to the lids of a set of molded caps to close the lids against the corresponding bases. Following closing of the lids, the injection molding system 10 may eject the molded caps from the second mold plate 18 and can restart the molding process.

Figure 3:
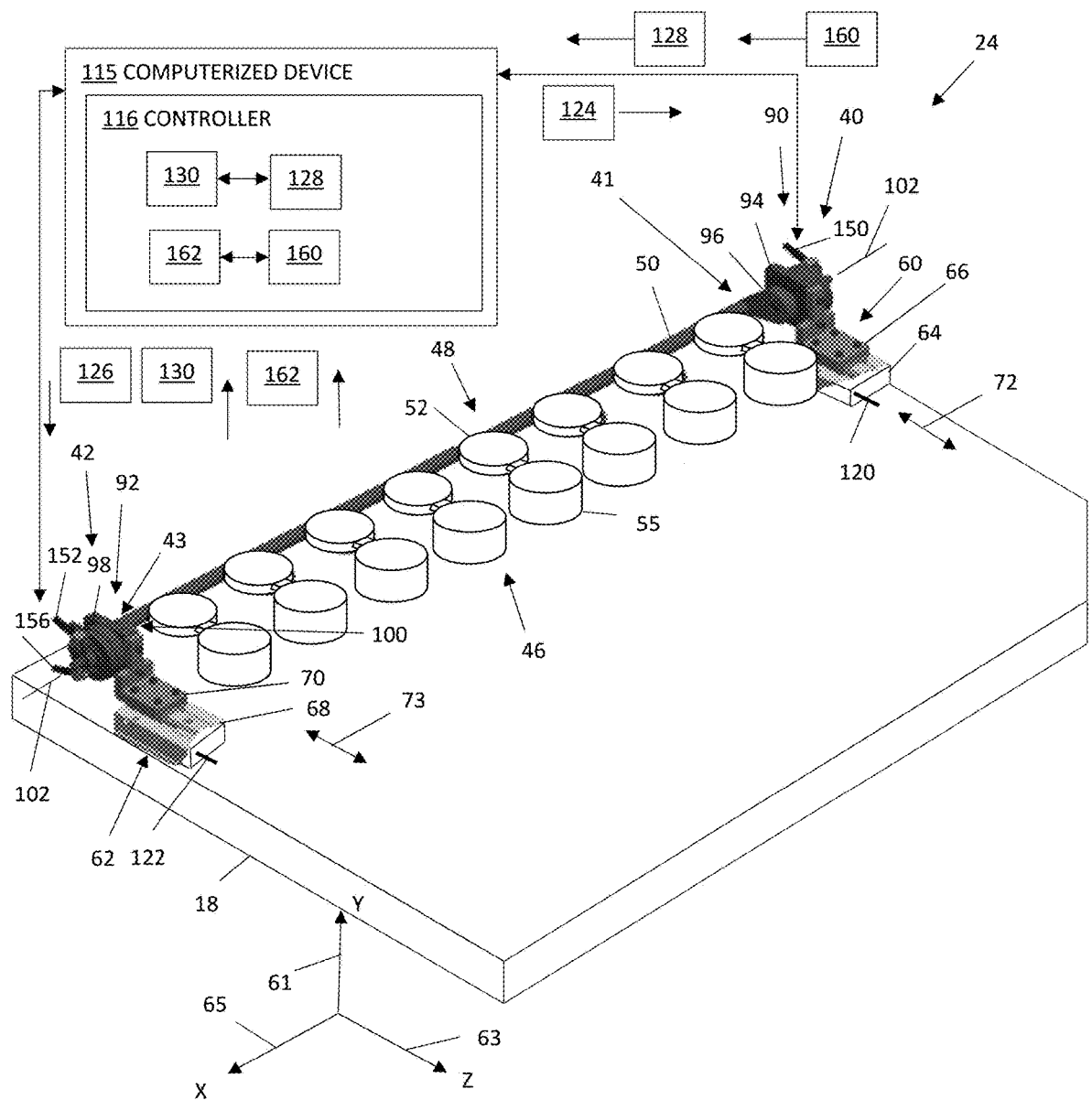
FIG. 3 illustrates a top perspective view of the in-mold lid closing apparatus of FIG. 2.

FIG. 3 illustrates an in-mold lid closing apparatus 24, according to an embodiment of the present innovation. As shown, the in-mold lid closing apparatus 24 may include a first actuation assembly 40 coupled to the second mold plate 18 at a first location and second actuation assembly 42 coupled to the second mold plate 18 at a second opposing location. For example, each actuation assembly 40, 42 may be disposed on either side of a row 46 of in-mold caps 48 molded by the injection molding system 10.

The in-mold lid closing apparatus 24 may include a lid engagement member 50 disposed between the first and second actuation assemblies 40, 42. For example, the first actuation assembly 40 may be connected to a first portion or end 41 of the lid engagement member 50 and the second actuation assembly 42 may be connected to a second opposing portion or end 43 of the lid engagement member 50. The lid engagement member 50 may be configured in a variety of ways. In one embodiment, the lid engagement member 50 may be configured as a shaft extending along a direction substantially parallel to an axis of rotation of in-mold lids 52 of the in-mold caps 48. With such a configuration, and during operation, the first actuation assembly 40 and the second actuation 42 assembly may dispose the lid engagement member 50 between a first linear position and a second linear position relative to the in-mold lids 52 and between a first rotational position and a second rotational position relative to the in-mold lids 52.

According to an embodiment of the present innovation, to linearly position the lid engagement member 50 between a first and a second linear position relative to the in-mold lids 52, the first and second actuation assemblies 40, 42 may each include corresponding first and second linear actuators 60, 62. For example, the first linear actuator 60 may include a first base 64 and a first translation element 66 moveably coupled to the first base 64 and the second linear actuator 62 may include a second base 68 and a second translation element 70 moveably coupled to the second base 68.

Figure 4:
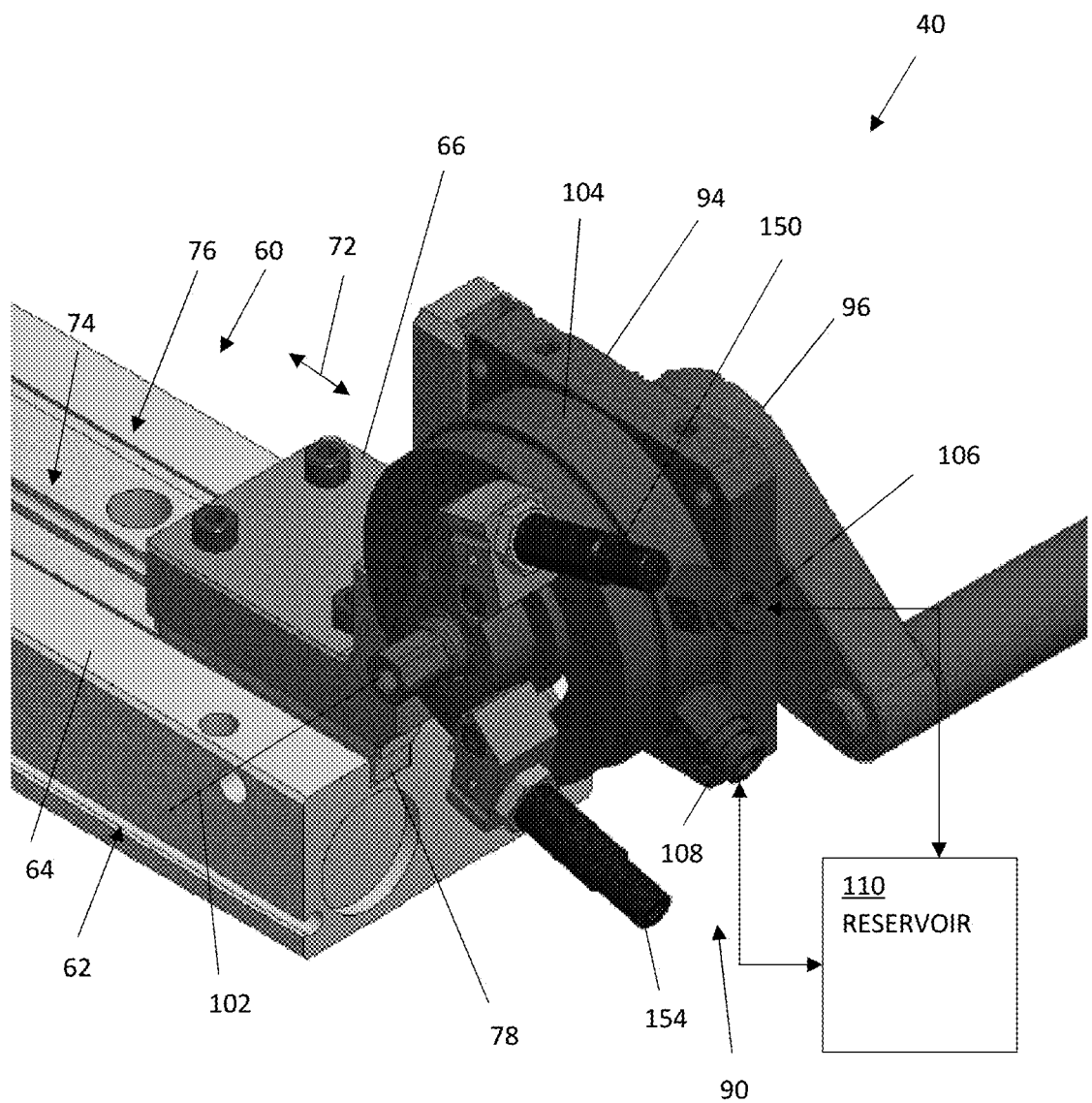
FIG. 4 illustrates a first side perspective view of an actuation assembly of the in-mold lid closing apparatus of FIG. 3.
Figure 5:
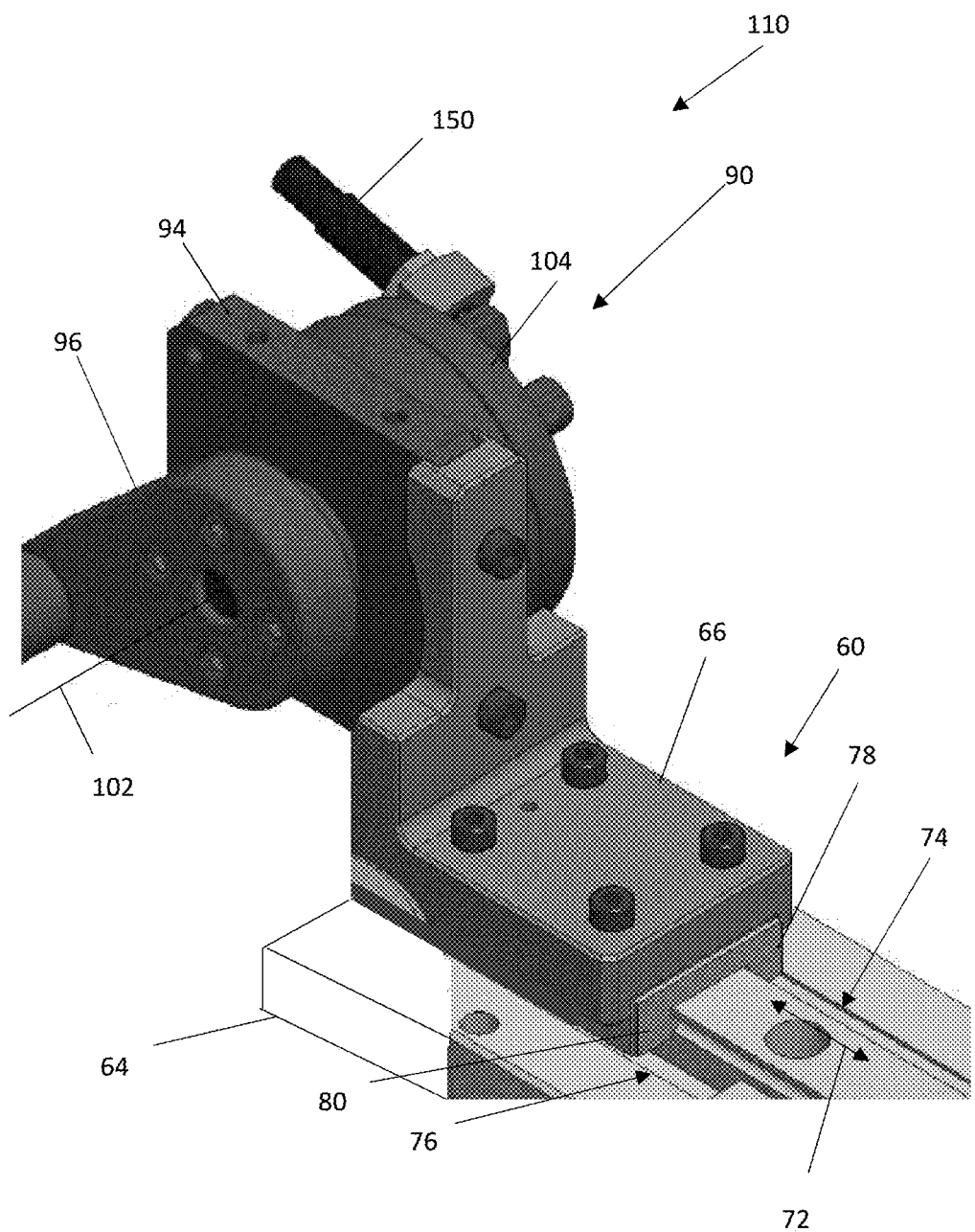
FIG. 5 illustrates a second side perspective view of the actuation assembly of FIG. 4.

During operation, the first and second translation elements 66, 70 may be configured to translate along corresponding and substantially parallel first and second linear axes 72, 73 relative to the respective bases 64, 68. For example, with reference to an embodiment of the first actuation assembly 60 illustrated in FIGS. 4 and 5, the first base 62 may define first and second parallel slots 74, 76 and the first translation element 66 may include protrusions 78, 80 disposed within the slots 74, 76. Interaction between the protrusions 78, 80 and the corresponding slots 74, 76 can constrain motion of the first translation element 66 to along the linear axis 72, as indicated.

Figure 6:
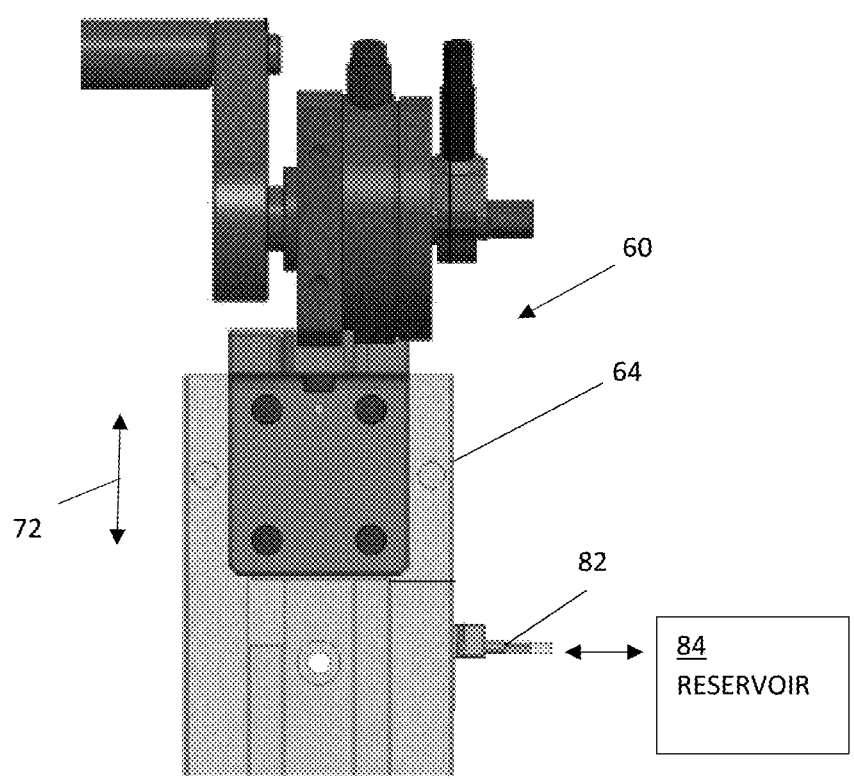
FIG. 6 illustrates a top view of the actuation assembly of FIG. 4.

The first and second linear actuators 60, 62 can be configured in a variety of ways. In one embodiment, the first and second linear actuators 60, 62 may take the form of, or include, a corresponding pneumatic device. For example, with reference to FIG. 6 and taking the first linear actuator 60 as an example, the first base 64 may be configured as pneumatic cylinder and may include a port 82 disposed in fluid communication with a fluid reservoir 84. During operation, an exchange of fluid between the first base 64 and the fluid reservoir 84 via the port 82 may adjust the position of the linear actuator 60 relative to the first base 64. First and second linear actuators 60, 62 may take other forms as well, such as electronic actuators.

Returning to FIG. 3, according to an embodiment of the present innovation, to rotationally position the lid engagement member 50 between a first and second rotational position relative to the in-mold lids 52, the first and second actuation assemblies 40, 42 may each include corresponding first and second rotary actuators 90, 92. For example, the first rotary actuator 90 may include a first support 94 coupled to the first translation element 66 and a first rotary element 96 coupled to a first end 41 of the lid engagement member 50. Further, the second rotary actuator 92 may include a second support 98 coupled to the second translation element 70 and a second rotary element 100 coupled to a second end 43 of the lid engagement member 50. The first and second rotary elements 96, 100 may dispose the lid engagement member 50 at an offset distance from an axis of rotation 102 that may facilitate rotation of the lid engagement member 50 in a Y-Z plane defined by a y-axis 61 and a z-axis 63.

The first and second rotary elements 96, 100 may be configured to rotate about the axis of rotation 102 relative to the first and second supports 94, 98 in operation. For example, with reference to an embodiment of the first actuation assembly 60 illustrated in FIGS. 4 and 5, the first rotary element 96 may be coupled to an axle which extends through an opening defined by the first support 94. Further, a first drive mechanism 104 may be coupled to the first support 94 and disposed in operational communication with the axle. In use, the first drive mechanism 104 may be configured to rotate the axle and corresponding first rotary element 96 in either a clockwise or counter clockwise direction about the axis of rotation 102. When the first drive mechanism 104 is utilized in conjunction with a second drive mechanism of the second actuation assembly 42, rotation of the first and second rotary elements 96, 100 may position the lid engagement member 50 between a first and second rotational position relative to the in-mold lids 52.

The first and second rotary actuators 90, 92 can be configured in a variety of ways. In an embodiment, the first and second rotary actuators 90, 92 may take the form of, or include, a corresponding pneumatic device. For example, with reference to FIG. 4 and taking the first rotary actuator 90 as an example, the first drive mechanism 104 may be configured as a pneumatic device and may include first and second ports 106, 108 disposed in fluid communication with a fluid reservoir 110. During operation, an exchange of fluid between the first drive mechanism 104 and the fluid reservoir 110 via the ports 106, 108 may adjust the rotational position of the first rotary element 96 relative to the first support 94. First and second rotary actuators 90, 92 may take other forms as well, such as electronic actuators, for example.

The first and second translation elements 66, 70 may be configured to translate along corresponding, and substantially parallel, first and second linear axes 72, 73. The first and second translation elements 66, 70 may translate at unequal rates, which can impart rotation or twisting of the lid engagement member 50 within an X-Z plane defined by the x-axis 65 and the z-axis 63. Further, the first and second rotary elements 96, 100 may be configured to rotate about the axis of rotation 102 relative to the first and second supports 94, 98. The first and second rotary elements 96, 100 may rotate at unequal rates, which can lead to rotation or twisting of the lid engagement member 50 within the Y-Z plane defined by the y-axis 61 and the z-axis 63. In either case, twisting of the lid engagement member 50 during operation may result in binding of the first and second linear actuators 60, 62 or the first and second rotary actuators 90, 92 during operation.

Accordingly, in an embodiment as provided in FIG. 3, in order to mitigate twisting or rotation of the lid engagement member 50 during either linear translation or rotational positioning, the in-mold lid closing apparatus 24 may include a computerized device 115 disposed in electrical communication with the first and second actuation assemblies 40, 42. For example, the computerized device 115 may include a controller 116, such as a memory and processor, and may take the form of a general purpose computer, such as a laptop or desktop computer, or of a mobile computerized device, such as a tablet device or smartphone. The computerized device 115 may be disposed in electrical communication with the first and second actuation assemblies 40, 42 via a wired connection or a wireless communication mechanism.

In an embodiment, the computerized device 115 may be configured to exchange electrical communication with each of the first and second actuation assemblies 40, 42 as part of a feedback loop to control the linear or rotational position of the lid engagement member 50. For example, the computerized device 115 may be configured to transmit first and second drive signals 124, 126, to the first and second actuation assemblies 40, 42, respectively, to drive either the linear position or the rotational position of the lid engagement member 50. Example drive signals 124, 126 may take the form of digital or analog signals. The computerized device 115 may also be configured to receive first and second feedback signals 128 or 160 and 130 or 162 from the first and second actuation assemblies 40, 42 where signals 128, 130 identify the linear positions of the first and second ends 41, 43 of the lid engagement member 50 and signals 160, 162 identify the or rotational positions of the first and second ends 41, 43 of the lid engagement member 50. Example feedback signals may take the form of digital or analog signals.

Based upon a comparison of the first and second feedback signals 128 or 160 and 130 or 162, prior to transmitting subsequent first and second drive signals 124, 126 to the actuation assemblies 40, 42, the computerized device 115 may adjust one of the first drive signal 124 and the second drive signal 126. Such adjustment may dispose the first and second ends 41, 43 of the lid engagement member 50 at substantially equal spatial position relative to each other. Implementation of such communication between the computerized device 115 and the first and second actuation assemblies 40, 42 as part of a feedback loop can mitigate side-to-side rotation of the lid engagement member 50 relative to the X-Z plane and subsequent binding of the actuation assemblies 40, 42 during operation.

In order to exchange electrical communication with the computerized device 115, the first and second linear actuators 60, 62 of the first and second actuation assemblies 40, 42 may be configured in a variety of ways.

In an embodiment, first and second linear actuators 60, 62 may each include corresponding first and second position sensors configured to exchange signals with the computerized device 115 to control the position of the lid engagement member 50 during operation. For example, first and second linear actuator sensors 120, 122, such as Hall-effect sensors, optical sensors, or encoders, may be disposed in electrical communication with the computerized device 115. During operation, the computerized device 115 can generate and transmit, as the first and second drive signals, first and second linear drive signals 124, 126 to first and second linear actuator sensors 120, 122 to drive a linear position of the first and second translation elements 66, 70 along axes 72, 73. In response to receipt of the linear drive signals 124, 126 by the linear actuator sensors 120, 122, the first and second linear actuators 60, 62 can adjust the linear positions of the first and second translation elements 66, 70, as well as the corresponding linear positions of the first and second ends 41, 43 of the lid engagement member 50, along axes 72, 73. For example, based upon a magnitude of the values associated with each of the linear drive signals 124, 126 (e.g., voltage values, digital values, etc.), the first and second linear actuators 60, 62 may adjust the pressure associated with the fluid reservoirs 110, 111 to cause a corresponding change in position of the first and second translation elements 66, 70 relative to the respective bases 64, 68.

In an embodiment, the first and second linear actuator sensors 120, 122 may be configured to transmit first and second linear feedback signals 128, 130, respectively, to the computerized device 115 in response to the first and second linear drive signals 124, 126. The first and second linear feedback signals 128, 130 may be configured to identify a vertical position of each of the first and second translation elements 66, 70, as well as the corresponding linear positions of the first and second ends 41, 43 of the lid engagement member 50 along axes 72, 73 and relative to the respective bases 64, 68.

For example, in response to receiving the first linear drive signal 124, the first linear actuator 60 moves the first translation element 66 a distance of 1.0 millimeter from a reference starting position. Further, where, in response to receiving the second linear drive signal 126, the second linear actuator 62 moves the second translation element 70 a distance of 0.8 millimeters from the same reference starting position. Based upon a detection of the linear motion of the first translation element 60, first linear actuator sensor 120 may generate the first linear feedback signal 128 having a signal value magnitude, such as a value of 1.0 V, which corresponds to the change in vertical position of the first translation element 60. Further, based upon a detection of the linear motion of the second translation element 66, the second linear actuator sensor 122 may generate the second linear feedback signal 130 having a signal value magnitude, such as a value of 0.8 V, which corresponds to the change in vertical position of the second translation element 70. Each of these feedback signals 128, 130 may be transmitted to the computerized device 115 and may identify to the computerized device 115 the vertical positions of the first and second translation elements 66, 70 relative to the respective bases 64, 68, as well as the vertical positions of the first and second portions 41, 43 of lid engagement member 50.

In an embodiment, the computerized device 115 may adjust at least one of the first drive signal 124 and the second drive signal 126 based upon the vertical positions of the first and second translation elements 66, 70 relative to the respective bases 64, 68, as well as the vertical positions of the first and second portions 41, 43 of lid engagement member 50 in response to receiving the first and second feedback signals 128, 130. For example, the computerized device 115 may provide updated first and second linear drive signals 124, 126 to the first and second linear actuators 60, 62 such that the linear position and the first portion 41 of the lid engagement member 50 and the linear position and the second portion 43 of the lid engagement member 50 correspond to each other (e.g., are disposed in substantially the same vertical axis position relative to the in-mold lids 52).

For example, the computerized device 115 receives, as the first feedback signal from the first linear actuator 60, a first linear feedback signal 128 having a signal value magnitude of 1.0 V and receives, as the second feedback signal from the second linear actuator 62, a second linear feedback signal 130 having a signal value magnitude of 0.8 V. Based upon a comparison of the first and second linear feedback signals 128, 130, the computerized device 115 may include instructions or a comparator to detect the value of the second linear feedback signal 130 as being less than the value of the first linear feedback signal 128, thereby indicating that the vertical position of the first translation element 66 and the first portion 41 of the lid engagement member 50 is closer to the in-mold caps 48 compared to the vertical position of the second translation element 70 and the second portion 43 of the lid engagement member 50.

With such detection, the computerized device 115 can provide updated first and second linear drive signals 124, 126 to the first and second linear actuators 60, 62 to advance the first and second translation elements 66, 70 relative to the respective bases 64, 68 while balancing the vertical positions of the first and second translation elements 66, 70. For example, the computerized device 115 may transmit an updated first drive signal 124 to the first linear actuator 60 to move the first translation element 66 a distance of 1.0 millimeters from its current position and may transmit an updated second drive signal 126 to the second linear actuator 62 to move the second translation element 70 a distance of 1.2 millimeters form its current position. By causing the advancement of the second translation element 70 further than that of the first translation element 66, the computerized device 115 may balance the vertical positioning of the first and second portions 41, 43 of the lid engagement member 50 relative to the in-mold caps to mitigate twisting or rotation of the lid engagement member 50 relative to the X-Z plane and potential binding or jamming of the first and second linear actuators 60, 62 caused by such twisting.

Following receipt of the updated first and second linear drive signals 126, 124, the feedback process may then be repeated by the first and second actuation assemblies 40, 42 and the computerized device 115. This process allows for continuous monitoring and adjustment of the first and second translation elements 66, 70 and the lid engagement member during translation both toward and away from the in-mold caps 48.

In order to exchange electrical communication with the computerized device 115, the first and second rotary actuators 90, 92 of the first and second actuation assemblies 40, 42 may be configured in a variety of ways.

In an embodiment, first and second rotary actuators 90, 92 may each include, as first and second position sensors, corresponding first and second rotational drive sensors 150, 152 disposed in electrical communication with the computerized device 115. While the first and second rotational drive sensors 150, 152 may be configured in a variety of ways, the rotational drive sensors 150, 152 can be Hall-effect sensors, optical sensors, or encoders. During operation, the computerized device 115 can generate and transmit first and second drive signals 124, 126 to first and second rotational drive sensors 150, 152 to drive a rotational position of the first and second rotary elements 96, 98 about axis 102. In response to receipt of the drive signals 124, 126 by the corresponding rotational drive sensors 150, 152, the first and second rotary actuators 90, 92 may adjust the rotational positions of the first and second rotary elements 96, 98, as well as the corresponding rotational positions of the first and second ends 41, 43 of the lid engagement member 50 about axis 102, such as based upon a magnitude of the values associated with each of the drive signals 124, 126 (e.g., voltage values, digital values, etc.).

In one embodiment, first and second rotary actuators 90, 92 may each include corresponding first and second rotary actuator sensors 154, 156 which may be configured to identify the rotational positions of the first and second rotary elements 96, 98 and to transmit first and second rotary feedback signals 160, 162, respectively, to the computerized device 115.

For example, in response to receiving the first drive signal 124, the first rotary actuator 90 rotates the first rotary element 96 through a 1.0 degree angle from a reference starting position. Further, where, in response to receiving the second drive signal 126, the second rotary actuator 92 rotates the second rotary element 98 through a 1.2 degree angle from the same reference starting position. Based upon a detection of the rotary motion of the first rotary actuator 90, first rotary actuator sensor 154 may generate the first rotary feedback signal 160 having a signal value magnitude, such as a value of 1.0 V, which corresponds to the change in rotational position of the first rotary element 96. Further, based upon a detection of the rotary motion of the second rotary element 98, the second rotary actuator sensor 156 may generate the second rotary feedback signal 162 having a signal value magnitude, such as a value of 1.2 V, which corresponds to the change in rotational position of the second rotary element 98. Each of these feedback signals 160, 162 may be transmitted to the computerized device 115 and may identify to the computerized device 115 the rotational or angular positions of the first and second rotary elements 96, 98, as well as the rotational or angular positions of the first and second portions 41, 43 of lid engagement member 50 within the Y-Z plane.

In an embodiment, the computerized device 115 may adjust at least one of the first drive signal 124 and the second drive signal 126 based upon the rotational positions of the first and second rotary elements 96, 98, as well as the rotational positions of the first and second portions 41, 43 of lid engagement member 50, in response to receiving the first and second rotary feedback signals 160, 162. For example, the computerized device 115 may provide updated first and second drive signals 124, 126 to the first and second rotary actuators 90, 92 such that the rotational position and the first portion 41 of the lid engagement member 50 and the rotational position of the second portion 43 of the lid engagement member 50 correspond to each other (e.g., are disposed in substantially the same rotational position relative to the in-mold lids 52).

For example, where the computerized device 115 may receive, as the first feedback signal from the first rotary actuator 90, a first rotary feedback signal 160 having a signal value magnitude of 1.0 V and receive, as the second feedback signal from the second rotary actuator 92, a second rotary feedback signal 162 having a signal value magnitude of 1.2 V. Based upon a comparison of the first and second rotary feedback signals 160, 162 in a similar manner as described before, the computerized device 115 can detect the value of the second rotary feedback signal 162 as being greater than the value of the first rotary feedback signal 160, thereby indicating that the rotational position of the first portion 41 of the lid engagement member 50 is behind the rotational position of the second portion 43 of the lid engagement member 50 relative to a starting position.

With such detection, the computerized device 115 can provide updated first and second drive signals 124, 126 to the first and second rotational drive sensors 150, 152 to advance the rotational position of the first and second rotary elements 96, 98 while balancing the rotational positions of the first and second end portions 41, 43 of the lid engagement member 50. For example, the computerized device 115 may transmit an updated first drive signal 124 to the first rotary actuator 90 to rotate the first rotary element 96 through a 1.0 degree angle from its present position and may transmit an updated second drive signal 126 to the second rotary actuator 92 to rotate the second rotary element 98 through a 0.8 degree angle from its present position. By causing the advancement of the second rotary element 98 to a smaller degree than that of the first rotary element 96, the computerized device 115 may balance the rotational positioning of the first and second portions 41, 43 of the lid engagement member 50 to mitigate twisting or rotation of the lid engagement member 50 within the Y-Z plane and potential binding or jamming of the first and second rotary actuators 90, 92 caused by such twisting.

Following receipt of the updated first and second drive signals 126, 124, the feedback process may then be repeated by the first and second actuation assemblies 40, 42 and the computerized device 115. This process allows for continuous monitoring and adjustment of the first and second rotary elements 96, 98 and the lid engagement member 50 during rotation both toward and away from the bases 55 of the in-mold lids 52.

Figure 7:
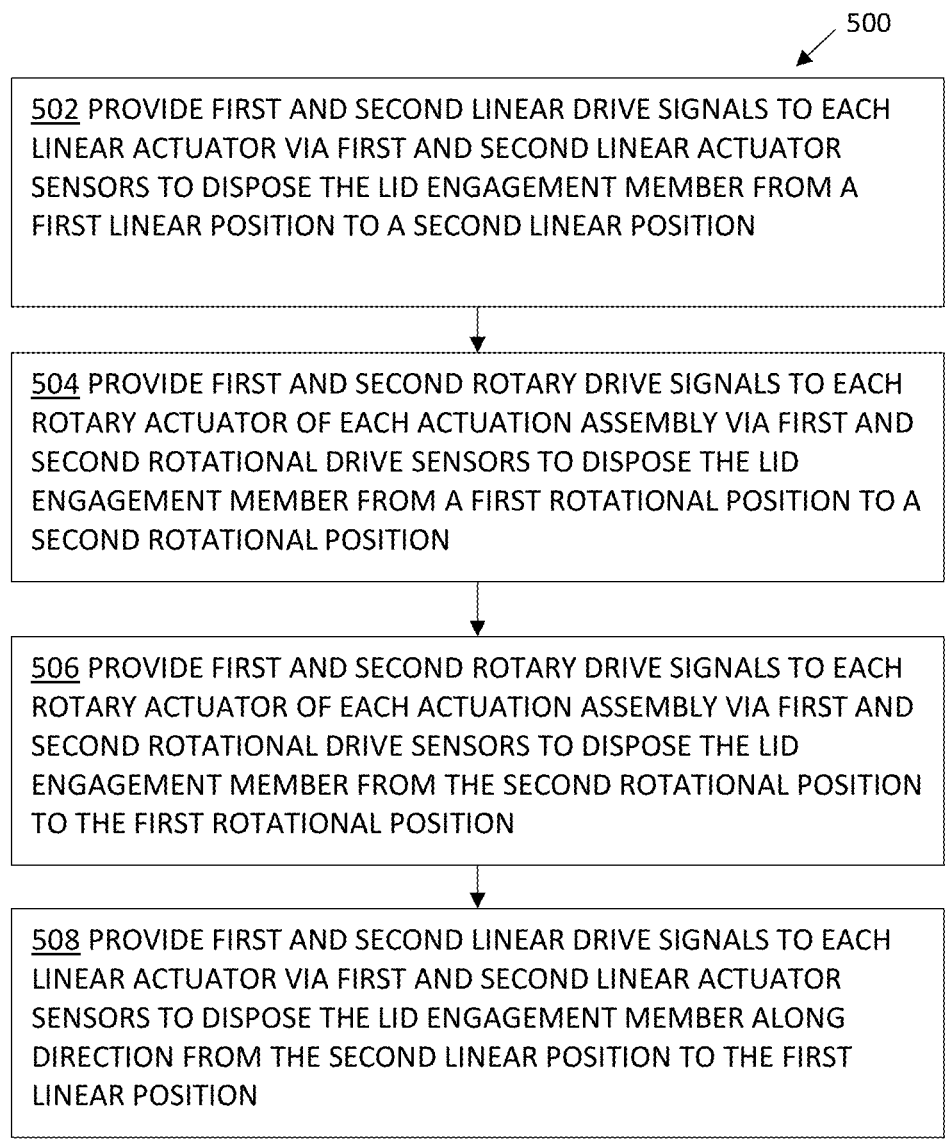
FIG. 7 is a flowchart of a process performed by the in-mold lid closing apparatus of FIG. 2.

The linear actuators 60, 62 and rotary actuators 90, 92 may be configured to operate in a sequential manner to laterally and rotationally position the lid engagement member 50 relative to a set of in-mold lids 52. FIG. 7 is a flowchart 500, and FIGS. 8-12 illustrate an example process, of operation of the in-mold lid closing apparatus 24, according to one embodiment.

Figure 8:
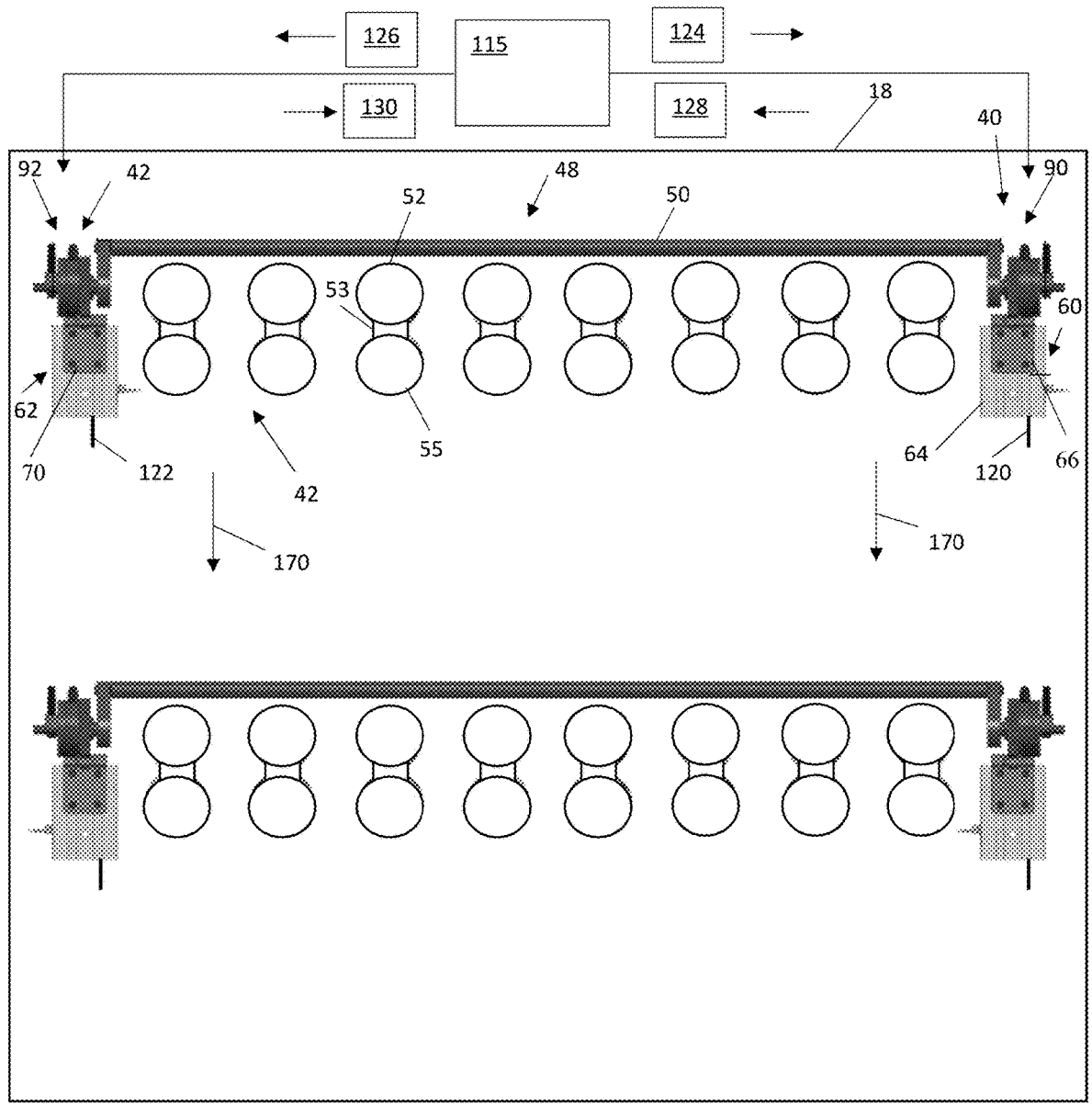
FIG. 8 illustrates a top view of the in-mold lid closing apparatus of FIG. 2 having a first actuation assembly and a second actuation assembly disposed in a first linear and a first rotational position relative to a set of in-mold lids.

With reference to FIG. 8, following a molding and cooling process, the second mold plate 18 includes a set of in-mold caps 48 having lids 52 disposed in an open position relative to the corresponding bases 55. In an initial position, the computerized device 115 maintains the linear actuators 60, 62 and rotary actuators 90, 92 of each actuation assembly 40, 42 in a retracted state relative to the lids 52 of the in-mold caps 48, as shown.

Figure 9:
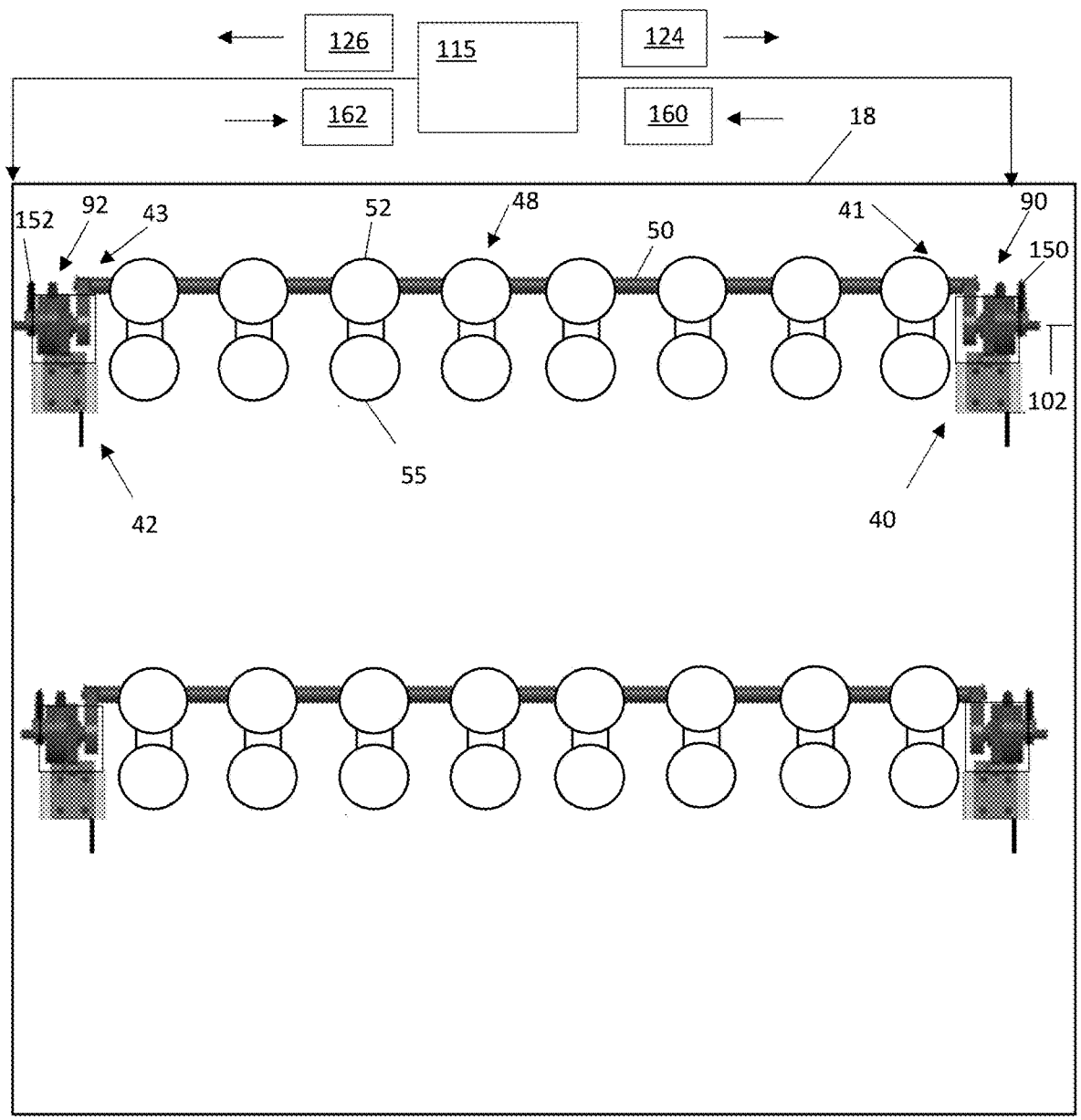
FIG. 9 illustrates the in-mold lid closing apparatus of FIG. 4 having the first actuation assembly and the second actuation assembly disposed in a second linear and the first rotational position relative to the set of in-mold lids.

To begin an in-mold lid closing process, as indicated in step 502 of FIG. 7, the computerized device 115 provides first and second linear drive signals 124, 126 to each linear actuator 60, 62 via first and second linear actuator sensors 120, 122 to dispose the lid engagement member 50 from a first linear position (e.g., retracted relative to the lids 52) to a second linear position (e.g., disposed in proximity to the lids 52). For example, in FIG. 8, the computerized device 115 may cause the first translation element 66 to translate along direction 170 relative to the first base 64 and the second translation element 70 to translate along direction 170 relative to the second base 68. During the translation, the first and second linear actuators 60, 62 may provide first and second linear feedback signals 128, 130, respectively, to the computerized device 115 to identify the linear positions of the first and second ends 41, 43 of the lid engagement member 50. As provided above, based upon a comparison of the first and second linear feedback signals 128, 130, the computerized device 115 may adjust or update the first and second linear drive signals 124, 126 to balance the linear positioning of the first and second portions 41, 43 of the lid engagement member 50 to mitigate twisting or rotation of the lid engagement member 50 within the X-Z plane. The generation of the linear drive signals 124, 126 and the linear feedback signals 128, 130 may continue in an iterative process until the first and second the linear actuators 60, 62 under the lids 52 of the in-mold caps 48 in the second linear position, as illustrated in FIG. 9.

Figure 10:
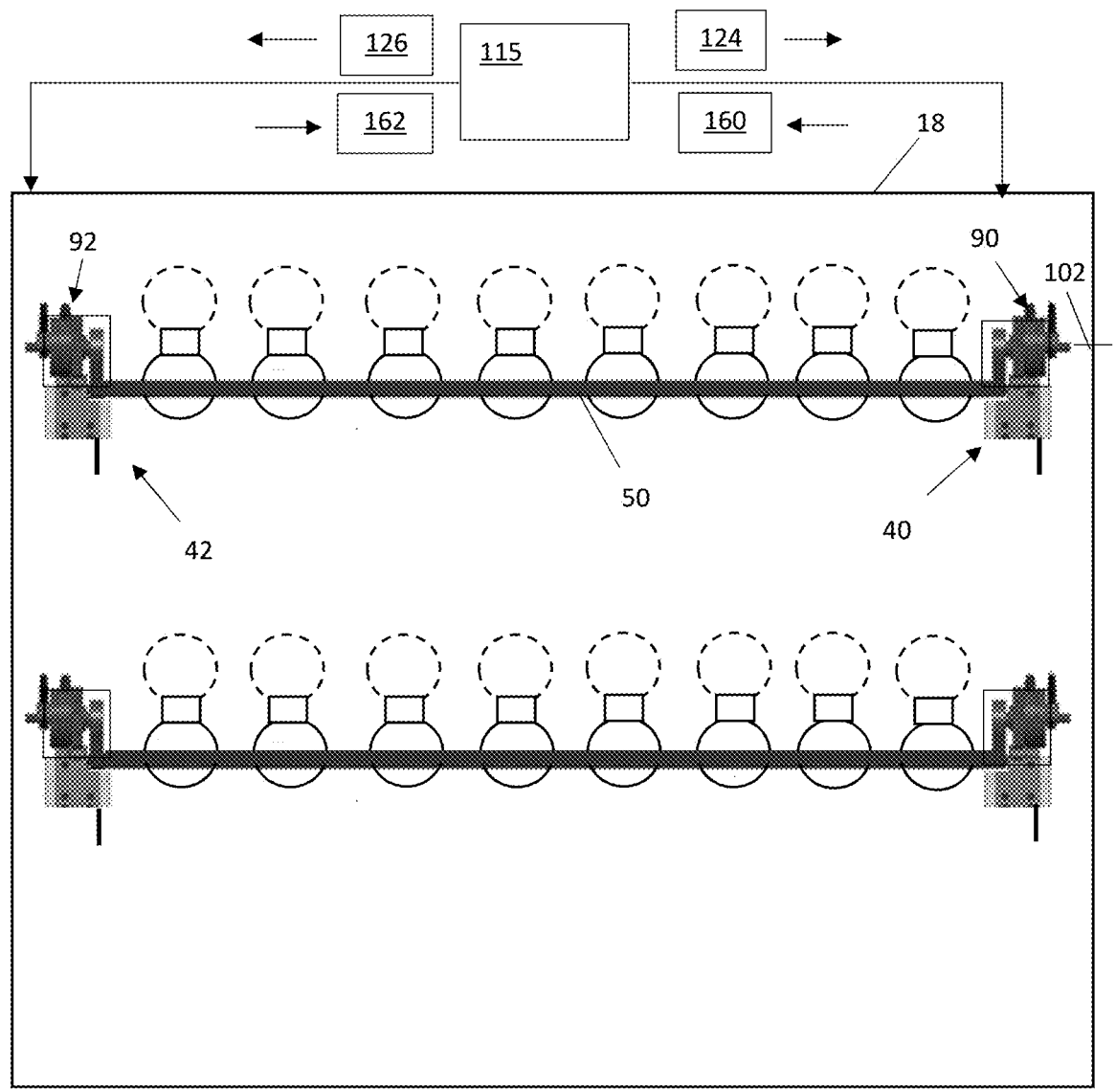
FIG. 10 illustrates the in-mold lid closing apparatus of FIG. 4 having the first actuation assembly and the second actuation assembly disposed in the second linear and a second rotational position relative to the set of in-mold lids.

The computerized device 115 may, as indicated in step 504 of FIG. 7, provide first and second rotary drive signals 124, 126 to each rotary actuator 90, 92 of each actuation assembly 40, 42 via first and second rotational drive sensors 150, 152 to dispose the lid engagement member 50 from a first rotational position to a second rotational position. For example, in FIG. 9 the computerized device 115 may cause the first and second rotary actuators 90, 92 to adjust the rotational positions of the first and second rotary elements 96, 98, as well as the corresponding rotational positions of the first and second ends 41, 43 of the lid engagement member 50, in a counterclockwise direction relative to axis 102. During the rotation, the first and second rotary actuators 90, 92 may provide first and second rotary feedback signals 160, 162 via first and second rotary actuator sensors 154, 156, respectively, to the computerized device 115 to identify the rotational positions of the first and second ends 41, 43 of the lid engagement member 50. As provided above, based upon a comparison of the first and second rotary feedback signals 160, 162, the computerized device 115 may adjust or update the first and second drive signals 124, 126 to balance the rotational positioning of the first and second portions 41, 43 of the lid engagement member 50 to mitigate twisting or rotation of the lid engagement member 50 within the Y-Z plane. The generation of the rotational drive signals 124, 126 and the rotary feedback signals 160, 162 may continue in an iterative process until the first and second the rotary actuators 90, 92 close the lids 52 against the bases 55 of each of the in-mold caps 48, as illustrated in FIG. 10.

Figure 11:
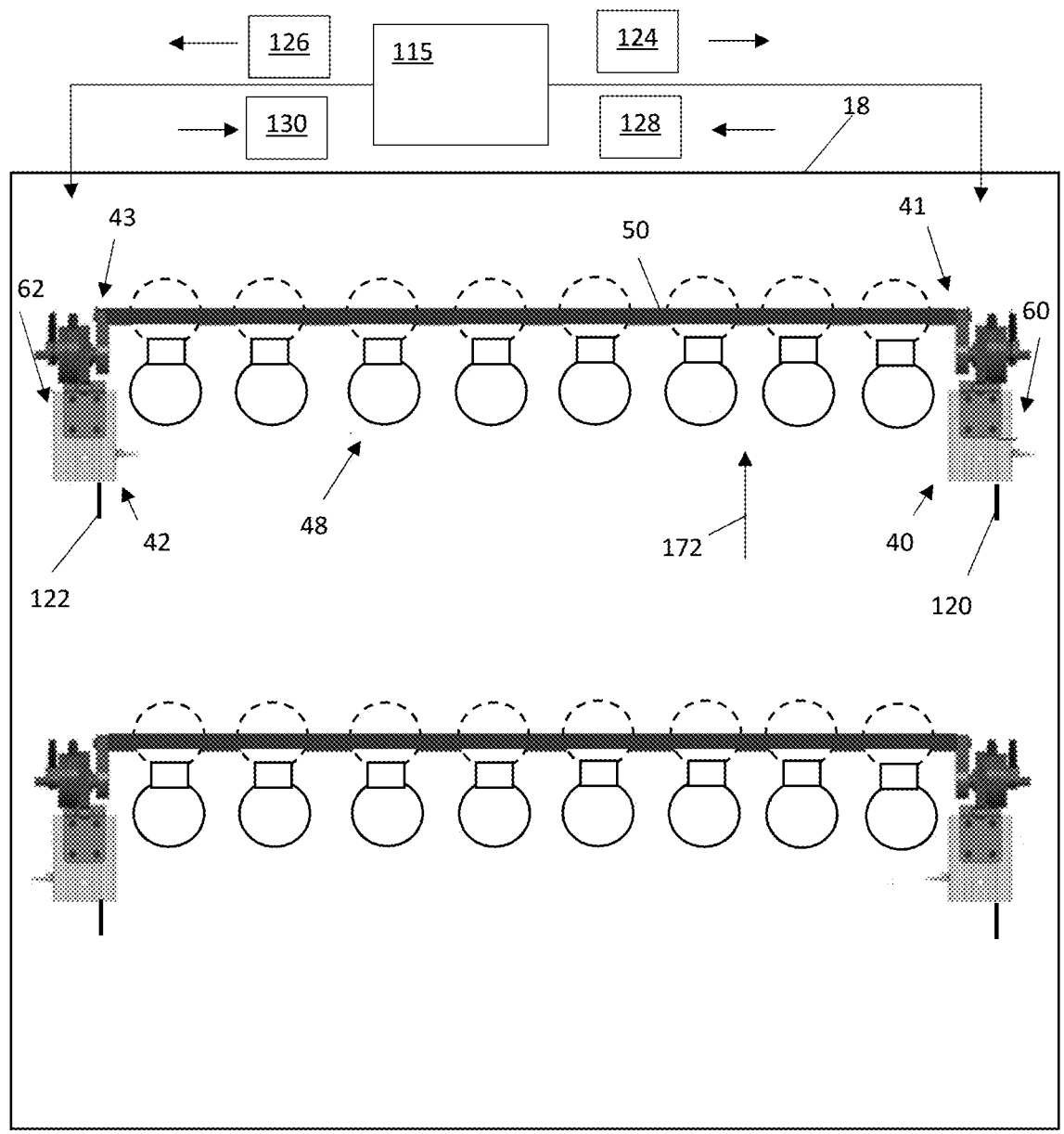
FIG. 11 illustrates the in-mold lid closing apparatus of FIG. 4 having the first actuation assembly and the second actuation assembly disposed in the second linear and the first rotational position relative to the set of in-mold lids.

The computerized device 115 may, as indicated in step 506 of FIG. 7, provide first and second rotary drive signals 124, 126 to each rotary actuator 90, 92 of each actuation assembly 40, 42 via first and second rotational drive sensors 150, 152 to dispose the lid engagement member 50 from the second rotational position to the first rotational position. For example, in FIG. 10 the computerized device 115 may cause the first and second rotary actuators 90, 92 to adjust the rotational positions of the first and second rotary elements 96, 98, as well as the corresponding rotational positions of the first and second ends 41, 43 of the lid engagement member 50, in a clockwise direction relative to axis 102. As provided above, the first and second rotary actuators 90, 92 may provide first and second rotary feedback signals 160, 162, respectively, to the computerized device 115 to identify the rotational positions of the first and second ends 41, 43 of the lid engagement member 50. This may to allow the computerized device 115 to adjust the first and second drive signals 124, 126 to balance the rotational positioning of the first and second portions 41, 43 of the lid engagement member 50 until the lid engagement member 50 is disposed in the first rotational position, as shown in FIG. 11.

Figure 12:
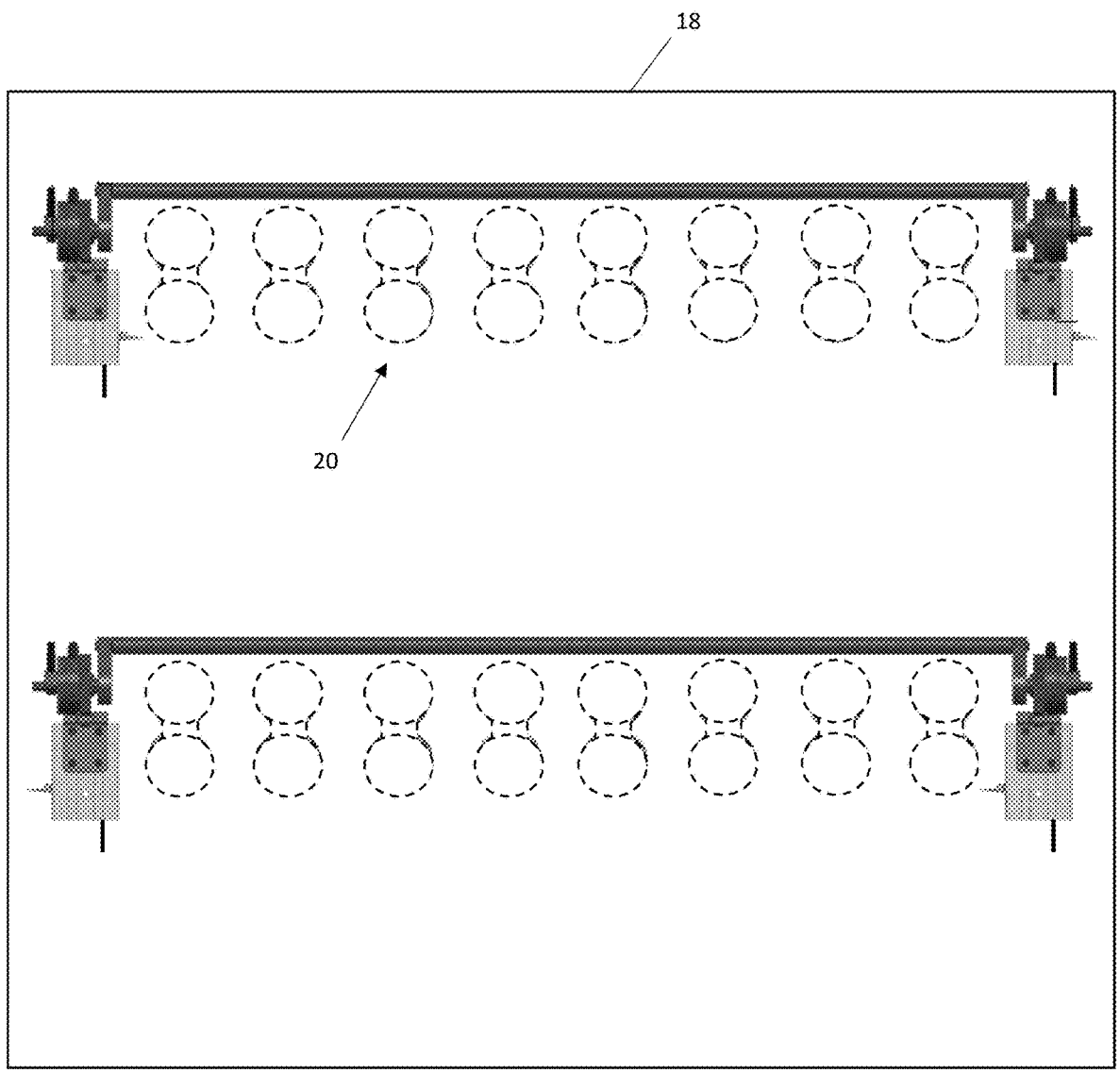
FIG. 12 illustrates the in-mold lid closing apparatus of FIG. 4 having the first actuation assembly and the second actuation assembly disposed in the first linear and the first rotational position relative to the set of in-mold lids.

At the end of the cycle, the computerized device 115 may, as indicated in step 508 of FIG. 7, provide first and second linear drive signals 124, 126 to each linear actuator 60, 62 via first and second linear actuator sensors 120, 122 to dispose the lid engagement member 50 along direction 172 from the second linear position to the first linear position illustrated in FIG. 12. As provided above, the first and second linear actuators 60, 62 may provide first and second linear feedback signals 128, 130, respectively, to the computerized device 115 to identify the linear positions of the first and second ends 41, 43 of the lid engagement member 50. This may to allow the computerized device 115 to adjust the first and second linear drive signals 124, 126 balance the linear positioning of the first and second portions 41, 43 of the lid engagement member 50 until the lid engagement member 50 is disposed in the first linear position, thereby allowing the second mold plate 18 to eject the in-mold caps 48 from the cap mold elements 20, as indicated in FIG. 12. The molding process may then be repeated.

With such a configuration of the in-mold lid closing apparatus 24, the first and second actuation assemblies 40, 42 may be disposed in a relatively low profile relative to the in-mold caps 48 to minimize the height of a corresponding injection molding system 10, relative to conventional injection molds. Further, the configuration of the first and second actuation assemblies 40, 42 to sequentially position the lid engagement member 50 relative to the in-mold caps 48 can mitigate the use of separate and relatively complex linear and rotational actuators to position lid engagement members, such as those that may be found in conventional injection molds.

As described above, the in-mold lid closing apparatus 24 includes a single pair of opposed actuation assemblies 40, 42 configured to position the lid engagement member 50 relative to a single set of the in-mold caps 48. Such description was by way of example only. The in-mold lid closing apparatus 24 may be configured in a variety of ways depending upon the layout of the first and second sets of cap mold elements 16, 20 of the injection molding system 10.

Figure 13:
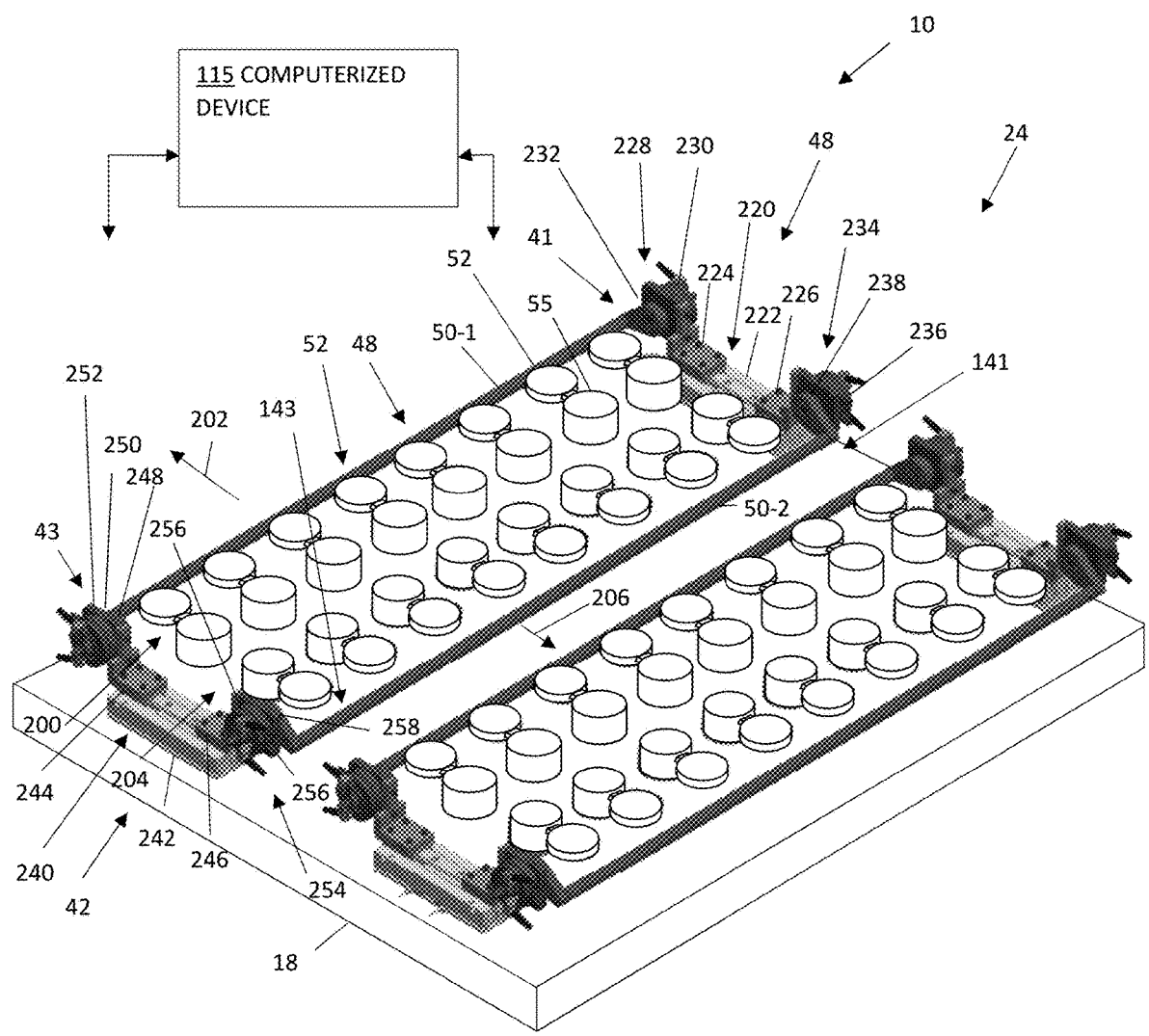
FIG. 13 illustrates a side-sectional, schematic view of an injection molding system having an in-mold lid closing apparatus.

For example, with reference to FIG. 13, assume the case where the injection molding system 10 is configured to mold a first row 200 of in-mold caps 48 such that each lid 52 is hingedly connected to, and extends in a first direction 202 from, a corresponding base 55. Further assume that the injection molding system 10 is configured to mold a second row 204 of in-mold caps 48 such that each lid 52 is hingedly connected to, and extends in a second direction 206 from, a corresponding base 55. With such a layout, the in-mold lid closing apparatus 24 may be configured to close the lids 52 of both the first and second rows 200, 204 of in-mold caps 48 against the corresponding bases 55 in a substantially simultaneous manner, such as described below.

For example, the first actuation assembly 40 may include a linear actuator 220 having a base 222, a first translation element 224 moveably coupled to the base 222, and a second translation element 226 moveably coupled to the base 222. The first actuation assembly 40 may include a first rotary actuator 228 having a first support 230 coupled to the first translation element 224 and a rotary element 232 coupled to the first support 230 and to a first portion 41 of a first lid engagement member 50-1. The first actuation assembly 40 may include a second rotary actuator 234 having a second support 236 coupled to the second translation element 226 and a rotary element 238 coupled to the second support 236 and to a first portion 141 of a second lid engagement member 50-2. The second actuation assembly 42 may include a linear actuator 240 having a base 242, a first translation element 244 moveably coupled to the base 242, and a second translation element 246 moveably coupled to the base 242. The second actuation assembly 42 may include a first rotary actuator 248 having a first support 250 coupled to the first translation element 244 and a rotary element 252 coupled to the first support 250 and to a second portion 43 of the first lid engagement member 50-1. The second actuation assembly 42 may include a second rotary actuator 254 having a second support 256 coupled to the second translation element 246 and a rotary element 258 coupled to the second support 256 and to a second portion 143 of the second lid engagement member 50-2.

With such a configuration, the computerized device 115 may provide first and second linear drive signals to the first and second actuation assemblies 40, 42 to linearly position first and second lid engagement members 50-1, 50-2 toward the lids 52 of the respective first and second rows 200, 204 of in-mold caps 48. Further, the computerized device 115 may receive linear feedback signals identifying the linear positioning of the first translation elements 224, 244 as well as linear feedback signals identifying the linear positioning of the second translation elements 226, 246. Additionally, the computerized device 115 may provide first and second rotary drive signals to the first and second actuation assemblies 40, 42 to rotationally position first and second lid engagement members 50-1, 50-2 relative to the bases 55 of the respective first and second rows 200, 204 of in-mold caps 48. Further, the computerized device 115 may receive rotary feedback signals identifying the rotational positioning of the first rotary elements 232, 248 as well as rotary feedback signals identifying the rotary positioning of the second rotary elements 238, 258.

While various embodiments of the innovation have been particularly shown and described, it will be understood by those skilled in the art that various changes in form and details may be made therein without departing from the spirit and scope of the innovation as defined by the appended claims.

What is claimed is:

1. An in-mold lid closing apparatus, comprising:
   a first lid engagement member extending along a direction substantially parallel to an axis of rotation of a lid portion of a first in-mold lid and a second lid engagement member extending along a direction substantially parallel to an axis of rotation of a lid portion of a second in-mold lid;
   a first actuation assembly connected to a first portion of the first lid engagement member and to a first portion of the second lid engagement member and a second actuation assembly connected to a second opposing portion of the first lid engagement member and to a second opposing portion of the second lid engagement member, the first actuation assembly and the second actuation assembly configured to dispose each lid engagement member between a first linear position and a second linear position relative to the respective first in-mold lid and the second in-mold lid and between a first rotational position and a second rotational position relative to the respective first in-mold lid and the second in-mold lid;
   the first actuation assembly comprising:
     a linear actuator having a first base, a first translation element moveably coupled to the first base, and a second translation element moveably coupled to the first base, the first translation element of the first actuation assembly configured to translate relative to the first base along a first linear direction and the second translation element of the first actuation assembly configured to translate relative to the first base along a second linear direction, the second linear direction opposing the first linear direction,
     a first rotary actuator having a first support coupled to the first translation element and a rotary element coupled to the first support and to the first portion of the first lid engagement member, and
     a second rotary actuator having a second support coupled to the second translation element and a rotary element coupled to the second support and to the first portion of the second lid engagement member; and
   the second actuation assembly comprising:
     a linear actuator having a second base, a first translation element moveably coupled to the second base, and a second translation element moveably coupled to the second base, the first translation element of the second actuation assembly configured to translate relative to the second base along the first linear direction and the second translation element of the second actuation assembly configured to translate relative to the second base along the second linear direction, the second linear direction opposing the first linear direction,
     a first rotary actuator having a first support coupled to the first translation element and a rotary element coupled to the first support and to the second portion of the first lid engagement member, and
     a second rotary actuator having a second support coupled to the second translation element and a rotary element coupled to the second support and to the second portion of the second lid engagement member; and
   a controller disposed in electrical communication with the first actuation assembly and the second actuation assembly, the controller configured to:
     transmit a first drive signal to the first actuation assembly and a second drive signal to the second actuation assembly to drive one of the linear position and the rotational position of the first lid engagement member and the second lid engagement member, and
     adjust at least one of the first drive signal and the second drive signal based upon a comparison of a first feedback signal received from the first actuation assembly identifying a position of the first portion of the first lid engagement member and a second feedback signal received from the second actuation assembly identifying a position of the second portion of the second lid engagement member.

2. The in-mold lid closing apparatus of claim 1, wherein when adjusting the at least one of the first drive signal and the second drive signal, the controller is configured to adjust at least one of the first drive signal transmitted to the first actuation assembly and the second drive signal transmitted to the second actuation assembly such that the linear position of the first portion of the first lid engagement member and the linear position of the second portion of the second lid engagement member correspond to each other.

3. The in-mold lid closing apparatus of claim 1, wherein when adjusting the at least one of the first drive signal and the second drive signal, the controller is configured to adjust at least one of the first drive signal transmitted to the first actuation assembly and the second drive signal transmitted to the second actuation assembly such that the rotational position of the first portion of the first lid engagement member and the rotational position of the second portion of the second lid engagement member correspond to each other.

4. The in-mold lid closing apparatus of claim 1, wherein:
the first translation element of the first actuation assembly is configured to linearly position the first portion of the first lid engagement member between the first linear position and the second linear position relative to the first in-mold lid and a first rotary element of the first actuation assembly is configured to rotatably position the first portion of the first lid engagement member between the first rotational position and the second rotational position relative to the first in-mold lid;
the first translation element of the second actuation assembly is configured to linearly position the second portion of the first lid engagement member between the first linear position and the second linear position relative to the first in-mold lid and a first rotary element of the second actuation assembly is configured to rotatably position the second portion of the first lid engagement member between the first rotational position and the second rotational position relative to the first in-mold lid;
the second translation element of the first actuation assembly is configured to linearly position the first portion of the second lid engagement member between the first linear position and the second linear position relative to the second in-mold lid and a second rotary element of the first actuation assembly is configured to rotatably position the first portion of the second lid engagement member between the first rotational position and the second rotational position relative to the second in-mold lid; and
the second translation element of the second actuation assembly is configured to linearly position the second portion of the second lid engagement member between the first linear position and the second linear position relative to the second in-mold lid and a second rotary element of the second actuation assembly is configured to rotatably position the second portion of the second lid engagement member between the first rotational position and the second rotational position relative to the second in-mold lid.

5. The in-mold lid closing apparatus of claim 1, wherein:
the linear actuator of the first actuation assembly comprises a first linear actuator sensor configured to transmit, as the first feedback signal, a first linear feedback signal to the controller, the first linear feedback signal corresponding to a vertical position of the first and second translation elements relative to the first base; and
the linear actuator of the second actuation assembly comprises a second linear actuator sensor configured to transmit, as the second feedback signal, a second linear feedback signal to the controller, the second linear feedback signal corresponding to a vertical position of the first and second translation elements relative to the second base.

6. The in-mold lid closing apparatus of claim 1, wherein:
the first rotary actuator of the first actuation assembly comprises a first rotary actuator sensor configured to transmit, as the first feedback signal, a first rotary feedback signal to the controller, the first rotary feedback signal corresponding to a rotational position of a first rotary element relative to the first support;
the first rotary actuator of the second actuation assembly comprises a second rotary actuator sensor configured to transmit, as the second feedback signal, a second rotary feedback signal to the controller, the second rotary feedback signal corresponding to a rotational position of a second rotary element relative to the second support.

7. The in-mold lid closing apparatus of claim 1, wherein:
the first translation element of the first actuation assembly is configured to translate relative to the first base along a first linear axis and the second translation element of the first actuation assembly is configured to translate relative to the first base along the first linear axis; and
the first translation element of the second actuation assembly is configured to translate relative to the second base along a second linear axis and the second translation element of the second actuation assembly is configured to translate relative to the second base along the second linear axis, the second linear axis being substantially parallel to the first linear axis.

8. The in-mold lid closing apparatus of claim 1, wherein:
the first lid engagement member comprises a shaft extending along the direction substantially parallel to the axis of rotation of the lid portion of the first in-mold lid; and
the second lid engagement member comprises a shaft extending along the direction substantially parallel to the axis of rotation of the lid portion of the second in-mold lid.

9. An injection molding system, comprising:
a first mold plate defining a first mold cavity;
a second mold plate opposing the first mold plate and defining a second mold cavity; and
an in-mold lid closing apparatus coupled to the second mold plate, the in-mold lid closing apparatus comprising:
a first lid engagement member extending along a direction substantially parallel to an axis of rotation of a lid portion of a first in-mold lid and a second lid engagement member extending along a direction substantially parallel to an axis of rotation of a lid portion of a second in-mold lid;
a first actuation assembly connected to a first portion of the first lid engagement member and to a first portion of the second lid engagement member and a second actuation assembly connected to a second opposing portion of the first lid engagement member and to a second opposing portion of the second lid engagement member, the first actuation assembly and the second actuation assembly configured to dispose each lid engagement member between a first linear position and a second linear position relative to the respective first in-mold lid and the second in-mold lid and between a first rotational position and a second rotational position relative to the respective first in-mold lid and the second in-mold lid;
the first actuation assembly comprising:
a linear actuator having a first base, a first translation element moveably coupled to the first base, and a second translation element moveably coupled to the first base, the first translation element of the first actuation assembly configured to translate relative to the first base along a first linear direction and the second translation element of the first actuation assembly configured to translate relative to the first base along a second linear direction, the second linear direction opposing the first linear direction,
a first rotary actuator having a first support coupled to the first translation element and a rotary element coupled to the first support and to the first portion of the first lid engagement member, and
a second rotary actuator having a second support coupled to the second translation element and a rotary element coupled to the second support and to the first portion of the second lid engagement member; and
the second actuation assembly comprising:
a linear actuator having a second base, a first translation element moveably coupled to the second base, and a second translation element moveably coupled to the second base, the first translation element of the second actuation assembly configured to translate relative to the second base along the first linear direction and the second translation element of the second actuation assembly configured to translate relative to the second base along the second linear direction, the second linear direction opposing the first linear direction,
a first rotary actuator having a first support coupled to the first translation element and a rotary element coupled to the first support and to the second portion of the first lid engagement member, and
a second rotary actuator having a second support coupled to the second translation element and a rotary element coupled to the second support and to the second portion of the second lid engagement member; and
a controller disposed in electrical communication with the first actuation assembly and the second actuation assembly, the controller configured to:
transmit a first drive signal to the first actuation assembly and a second drive signal to the second actuation assembly to drive one of the linear position and the rotational position of the first lid engagement member and the second lid engagement member, and
adjust at least one of the first drive signal and the second drive signal based upon a comparison of a first feedback signal received from the first actuation assembly identifying a position of the first portion of the first lid engagement member and a second feedback signal received from the second actuation assembly identifying a position of the second portion of the second lid engagement member.

10. The injection molding system of claim 9, wherein when adjusting the at least one of the first drive signal and the second drive signal, the controller is configured to adjust at least one of the first drive signal transmitted to the first actuation assembly and the second drive signal transmitted to the second actuation assembly such that the linear position of the first portion of the first lid engagement member and the linear position of the second portion of the second lid engagement member correspond to each other.

11. The injection molding system of claim 9, wherein when adjusting the at least one of the first drive signal and the second drive signal, the controller is configured to adjust at least one of the first drive signal transmitted to the first actuation assembly and the second drive signal transmitted to the second actuation assembly such that the rotational position of the first portion of the first lid engagement member and the rotational position of the second portion of the second lid engagement member correspond to each other.

12. The injection molding system of claim 9, wherein:
the first translation element of the first actuation assembly is configured to linearly position the first portion of the first lid engagement member between the first linear position and the second linear position relative to the first in-mold lid and a first rotary element of the first actuation assembly is configured to rotatably position the first portion of the first lid engagement member between the first rotational position and the second rotational position relative to the first in-mold lid;
the first translation element of the second actuation assembly is configured to linearly position the second portion of the first lid engagement member between the first linear position and the second linear position relative to the first in-mold lid and a first rotary element of the second actuation assembly is configured to rotatably position the second portion of the first lid engagement member between the first rotational position and the second rotational position relative to the first in-mold lid;
the second translation element of the first actuation assembly is configured to linearly position the first portion of the second lid engagement member between the first linear position and the second linear position relative to the second in-mold lid and a second rotary element of the first actuation assembly is configured to rotatably position the first portion of the second lid engagement member between the first rotational position and the second rotational position relative to the second in-mold lid; and
the second translation element of the second actuation assembly is configured to linearly position the second portion of the second lid engagement member between the first linear position and the second linear position relative to the second in-mold lid and a second rotary element of the second actuation assembly is configured to rotatably position the second portion of the second lid engagement member between the first rotational position and the second rotational position relative to the second in-mold lid.

13. The injection molding system of claim 9, wherein:
the linear actuator of the first actuation assembly comprises a first linear actuator sensor configured to transmit, as the first feedback signal, a first linear feedback signal to the controller, the first linear feedback signal corresponding to a vertical position of the first and second translation elements relative to the first base; and
the linear actuator of the second actuation assembly comprises a second linear actuator sensor configured to transmit, as the second feedback signal, a second linear feedback signal to the controller, the second linear feedback signal corresponding to a vertical position of the first and second translation elements relative to the second base.

14. The injection molding system of claim 9, wherein:
the first rotary actuator of the first actuation assembly comprises a first rotary actuator sensor configured to transmit, as the first feedback signal, a first rotary feedback signal to the controller, the first rotary feedback signal corresponding to a rotational position of a first rotary element relative to the first support;
the first rotary actuator of the second actuation assembly comprises a second rotary actuator sensor configured to transmit, as the second feedback signal, a second rotary feedback signal to the controller, the second rotary feedback signal corresponding to a rotational position of a second rotary element relative to the second support.

15. The injection molding system of claim 9 wherein:
the first translation element of the first actuation assembly is configured to translate relative to the first base along a first linear axis and the second translation element of the first actuation assembly is configured to translate relative to the first base along the first linear axis; and
the first translation element of the second actuation assembly is configured to translate relative to the second base along a second linear axis and the second translation element of the second actuation assembly is configured to translate relative to the second base along the second linear axis, the second linear axis being substantially parallel to the first linear axis.

16. The injection molding system of claim 9, wherein:
the first lid engagement member comprises a shaft extending along the direction substantially parallel to the axis of rotation of the lid portion of the first in-mold lid; and
the second lid engagement member comprises a shaft extending along the direction substantially parallel to the axis of rotation of the lid portion of the second in-mold lid.

17. The in-mold lid closing apparatus of claim 1, wherein when adjusting the at least one of the first drive signal and the second drive signal based upon the comparison of the first feedback signal received from the first actuation assembly and the second feedback signal received from the second actuation assembly, the controller is configured to:
dispose the first portion and the second portion of the first lid engagement member at a substantially equal spatial position relative to each other; and
dispose the first portion and the second portion of the second lid engagement member at a substantially equal spatial position relative to each other.

18. The injection molding system of claim 9, wherein when adjusting the at least one of the first drive signal and the second drive signal based upon the comparison of the first feedback signal received from the first actuation assembly and the second feedback signal received from the second actuation assembly, the controller is configured:
dispose the first portion and the second portion of the first lid engagement member at a substantially equal spatial position relative to each other; and
dispose the first portion and the second portion of the second lid engagement member at a substantially equal spatial position relative to each other.

\* \* \* \* \*